April 21, 1931.  H. J. HEIDER  1,801,271
DEVICE FOR ASSEMBLING WHEELS
Filed Aug. 7, 1930
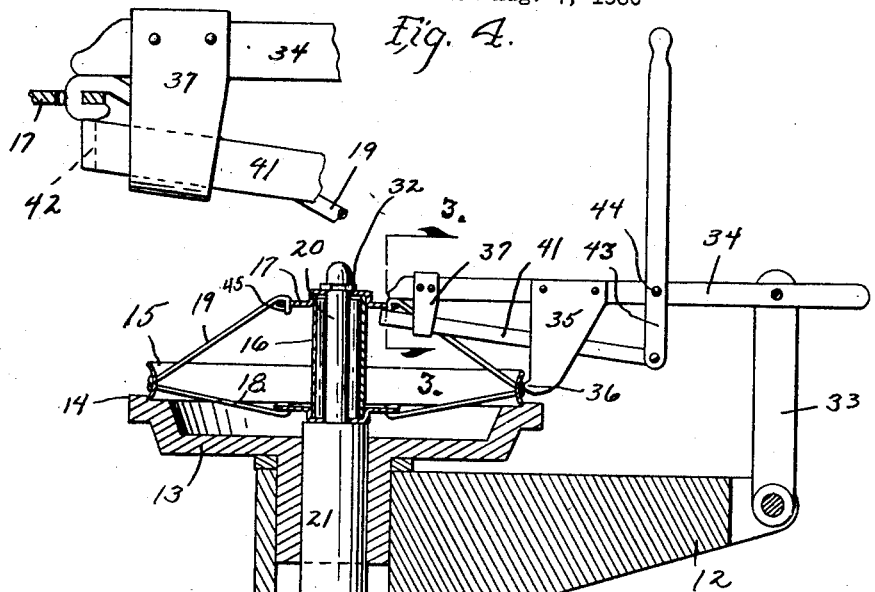
Fig. 4.
Fig. 2.
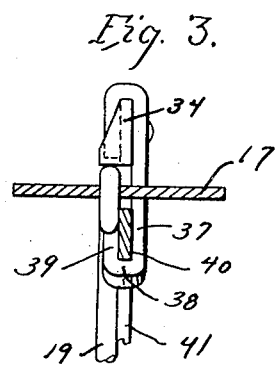
Fig. 3.
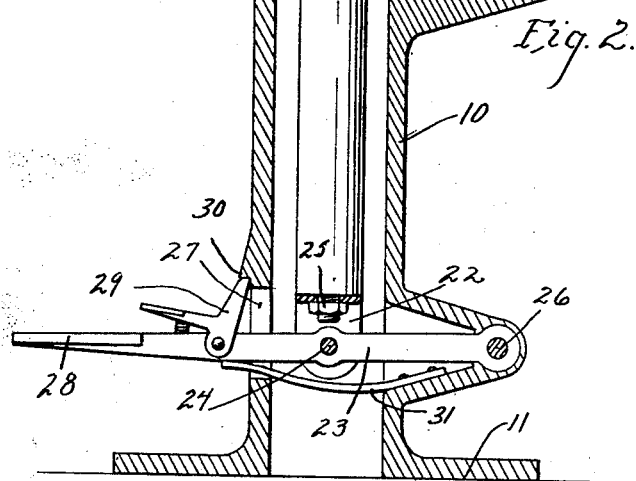
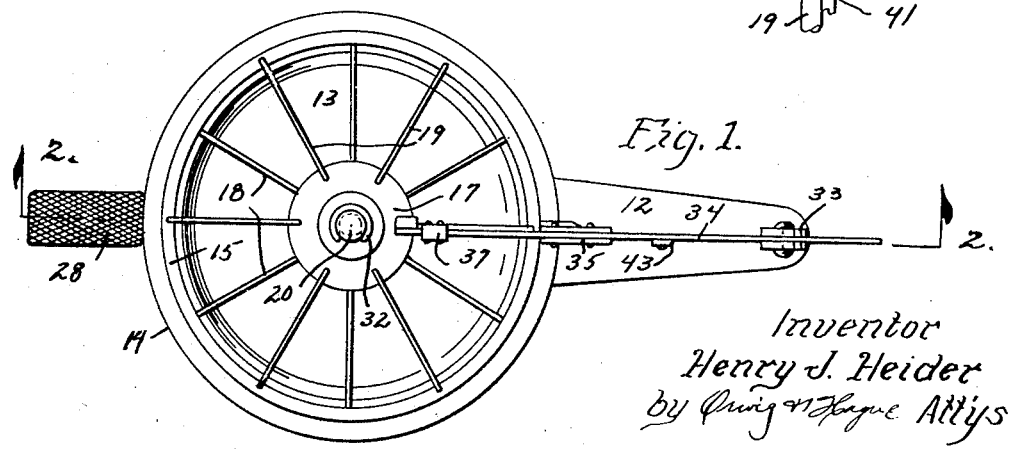
Fig. 1.
Inventor
Henry J. Heider
by Craig & Hogue Attys Patented Apr. 21, 1931

1,801,271

UNITED STATES PATENT OFFICE

HENRY J. HEIDER, OF CARROLL, IOWA

DEVICE FOR ASSEMBLING WHEELS

Application filed August 7, 1930. Serial No. 473,691.

The object of my invention is to provide a simple, durable and inexpensive means for easily and quickly assembling wire wheels of the type having a hub member, a spoke supporting flange at each end, and a rim member connected to said flanges by means of wire spokes, whereby the spokes will all be of substantially uniform tension when the wheel is completely assembled.

More specifically it is the object of my invention to provide an assembling device adapted to support a wheel rim and hub, and to have one set of spokes connecting one end of the hub with the rim and to place the connected set of spokes under tension so that the second set of spokes may be loosely placed in position, and when so placed to provide means for setting or anchoring the second set of spokes.

A further object is to provide in a device for assembling wheels having wire spokes improved means for easily and quickly setting and anchoring the spokes therein without riveting or welding, whereby the setting of the spokes will cause them to be slightly shortened and placed under tension, so that when all of the spokes of a complete series of spokes have been set, the desired tension will be uniformly distributed to the spokes.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a plan view of my improved device showing the manner in which it is applied to a wheel being assembled.

Figure 2 is a sectional view taken on the line 2—2 of Figure 1.

Figure 3 is a detail sectional view taken on the line 3—3 of Figure 2.

Figure 4 is an enlarged side elevation of the hook turning mechanism, a portion of the hub flange being in section.

My improved assembling device comprises a stand 10 having a base member 11 and a laterally projecting arm 12. A rim supporting table 13 is rotatably mounted in the upper end of the stand 10, and is provided with an annular flange 14 on its upper surface for receiving the rim 15 of the wheel being assembled. Said wheel is provided with a hub 16 having a spoke supporting flange 17 at each end. One of the flanges 17 is connected with the rim 15 by a set of spokes 18, and the opposite flange is connected with the rim by a set of spokes 19 applied in the manner hereinafter more fully disclosed.

The hub 16 is rotatively mounted on a pintle 20 projecting upwardly from the upper end of a rotatively mounted shaft 21, which has its lower end provided with a yoke 22 pivotally connected to a lever 23 by means of a pivot pin 24. The yoke 22 is pivotally connected to the shaft 21 by means of a bolt 25. One end of the lever 23 is pivoted to the member 10 by means of a pivot 26. The opposite end of said lever projects through an opening 27 in said stand, and is provided with a foot pedal 28. A latch 29 is pivoted to the lever 28 and is designed to engage a lug 30 for the purpose of locking the shaft 25 at its lower limit of movement.

A spring 31 is provided for elevating the lever 23 and the shaft 25. The upper end of the member 20 is provided with a detachable key plate 32 which provides means whereby the hub 16 may be locked on the pintle and permitted to rotate freely.

Pivoted to the outer end of the arm 12 is a link 33 having a bar 34 pivoted to its upper end. The central portion of the bar 34 is provided with a downwardly extending bracket 35, the lower end of which terminates in a boss 36. The inner end of the bar 34 is provided with a guide plate 37 having its lower end provided with a laterally extending portion 38 terminating in an upwardly extending portion 39, as clearly shown in Figure 3, so that a groove 40 is formed in the bottom of the guide in which is slidably mounted what I shall term a bending bar 41.

The inner end of the bar 41 is provided with a laterally extending portion 42, while the outer end of said bar is pivotally connected to the lower end of a lever 43, which is in turn pivotally connected to the bar 34 by a pivot 44.

The operation of my device is as follows:

It will be seen by referring to Figure 2 that the table 13 is rotatively mounted in the upper end of the stand 10, while the shaft 21 is free to slide vertically through the center of said table.

In assembling the wheel, the spokes 18 are first applied to the rim and the corresponding flange 17, which may be easily done, inasmuch as no tension is at that time applied to said spokes. The hub 16 is then placed on the pintle 20 and the key plate 32 placed in position with the lower edge of the rim 15 resting on top of the table 13 and inside of the flange 14.

The operator's foot is then placed on the pedal 38 and moved downwardly, permitting the latch 29 to engage the under surface of the lug 30, causing the shaft 21 to be lowered, and with it the hub 16 which will place a predetermined amount of tension on the spokes 18, so that the spokes 19 may be easily placed in position in the manner illustrated in Figure 2.

The said spokes 19 have heads on the outer ends to rest in suitable sockets in the rim while the inner ends of the spokes are bent to lie parallel with the outer surface of the upper flange 17. The last said portion is provided with a downwardly extending member 45 designed to be supported in a suitable opening in the hub flange with the lower end of the hook member 45 extending some distance below said flange.

After all of the spokes 19 have been placed in position, then the operator grasps the upper end of the handle 43 with one hand and swings the same inwardly toward the center of the wheel hub, causing the upper end of the link 33 to be swung inwardly and the inner end of the bar 34 to be moved into position above the upper face of the flange 17, with the member 42 below said flange with the boss 36 engaging the head of the spoke to be set.

The inner ends of the members 34 and 41 are then moved laterally, causing the under surface of the inner end of the member 34 to engage the upper surface of the closed portion of the hook above the flange 17, and the flange 42 to be passed inside of the downwardly projecting hook member 45, in the manner clearly illustrated in Figure 2.

Further inward movement of the upper end of the lever 43 will then tend to move the bar 34 longitudinally and inwardly, and also tend to apply pressure between the boss 36 and the head of the spoke which it engages. The bar 41 will then be moved outwardly causing the member 42 to engage the hook member 45 and the same to be bent outwardly to position adjacent to the under surface of the flange, in the manner illustrated in Figure 4.

It will be seen by reference to Figure 2 that the bar 41 is placed in inclined relation with the bar 34, so that outward longitudinal movement of said bar will cause its inner end to move downwardly a slight distance from the inner end of the bar 34, thus providing means whereby the said member 45 may be permitted to pass between the upper edge of the member 42 and the flange 17. However, the angularity of the bar 41 is such that a pinching action will be applied between the member 42 and the inner end of the bar 34, so that the closed portion of the hook will be held firmly against the flange 17 at the time the member 45 is being bent, and the metal of the hook portion permanently set.

It will be seen that as the upper end of the lever 43 is moved inwardly, a slight inward movement of the bar 34 will take place at the same time the outward movement of the bar 41 takes place, causing the hook portion to be slightly rotated or drawn to position, which will result in the spoke 19 being slightly shortened so that all of the spokes may be placed in position under slight and uniform tension.

After all of the spokes have thus been set, the latch 29 is released from the lug 30, and the shaft 21 permitted to move upwardly, permitting further strain to be placed on the spokes 19 and to be evenly distributed with the strain on the spokes 18.

The drawings illustrate my improved spoke setting device used in connection with means for applying preliminary tension to one set of spokes. It will readily be seen that the said setting device may be used in connection with a single set of spokes supported in a plane perpendicular to the wheel axis, in which case the tension applied by the spoke setting mechanism will be sufficient without auxiliary tension applying mechanism.

One advantage of my device lies in the fact that excessive strain does not need to be applied to the spokes 18 in order to properly tighten the spokes 19, as heretofore has been necessary, due to the fact that the slight shortening of the spokes 19 takes place as the hook member is closed.

Thus it will be seen that I have provided means for setting and securing the spokes of wire wheels of simple, durable and inexpensive construction, which may be easily and quickly applied and operated, and whereby the spokes thus set will be of uniform tension and length.

I claim as my invention:—

1. The combination of a wheel assembling device adapted to support a wheel rim and hub having spaced flanges, with one set of spokes under tension and the other set loosely supported with their heads in said rim and their opposite ends hooked into a corresponding hub flange, with means for setting the said hooks with the spokes under compression, said means comprising means for applying inward and longitudinal pressure to the head of one of said spokes, means for engaging the closed side of said hook and applying lateral pressure thereto and toward said flange, and means for bending the free end of said hook inwardly and longitudinally of said spoke.

2. The combination of a wheel assembling device adapted to support a wheel rim and hub having spaced flanges, with one set of spokes under tension and the other set loosely supported with their heads in said rim and their opposite ends hooked into a corresponding hub flange, with means for setting the said hooks with the spokes under compression, said means comprising means for applying inward and longitudinal pressure to the head of one of said spokes, means for engaging the closed side of said hook and applying lateral pressure thereto and toward said flange, and toward the axis of said hub, and means for bending the free end of said hook inwardly and longitudinally of said spokes.

3. In a wheel assembling device, a support, a link pivoted thereto, a bar pivoted to said link, a laterally projecting bracket secured to said bar having a boss for engaging a spoke head, a guide supported by the inner end of said bar, an inclined bending bar having one end slidingly mounted in said guide, a lever pivotally connected to the opposite end of said bending bar, the slidably mounted end of said bending bar being provided with a spoke engaging flange, said flange being slightly spaced from the inner end of said bar.

4. In combination, an upright stand, a rim table rotatively mounted thereon, a shaft slidably mounted axially of said table, a lever for imparting sliding movement to said shaft, yieldable means for moving said lever in one direction, a latch device for locking the lever against movement in the opposite direction, an upright link pivotally connected to said stand, a horizontal bar pivotally connected to the upper end of said link, said bar having a downwardly extending bracket near its central portion, the lower end of which is provided with a boss for engaging a spoke head, the inner end of said bar being provided with a downwardly extending guide, a bending bar having one end slidably mounted in said guide, a lever pivotally connected to the opposite end of said bending bar and to the first bar, the inner end of said bending bar being provided with a hook engaging flange spaced a slight distance beneath the inner end of said bar.

5. In combination with a stand having a rim supporting table and a hub supporting member adapted to place one set of wheel spokes under tension when the wheel is placed thereon, whereby another set of wheel spokes may be loosely placed in position with their head portions in said rim and their inner ends provided with hook portions entering the flange of said hub, means applied to the head portion and the hook portion of said spoke for shortening said spoke and for completing the bending of said hook members and setting the same when bent.

6. The combination of a wheel assembling device adapted to support a wheel rim, a hub having a flange provided with openings for receiving spokes, said hub and rim being supported in fixed concentric relation to each other, said rim being designed to receive the heads of said spokes, the inner ends of which have right angle extending portions supported in and extending through the holes of said flanges, said means comprising means for applying inward and longitudinal pressure to the head of one of said spokes, means for engaging the inner end of said spokes and applying lateral pressure thereto and toward said flange, and means for bending the free end of the laterally extending portion of said spokes inwardly and longitudinally thereof to cause the hook portion thus formed to be slightly drawn through said opening and the spoke shortened and the said hook portion permanently set.

7. In a device for setting a wire spoke having a head at one end to be supported in a wheel rim and a laterally projecting portion at its opposite end designed to be supported in and projected loosely through a hub flange opening, means for applying pressure to said head inwardly and longitudinally of said spoke, means for applying lateral and longitudinal pressure to the inner end of said spoke and toward said flange, means for bending the free end of said spoke toward its head and adjacent to said flange, whereby the hook portion thus formed is slightly drawn through said flange opening and the spoke slightly shortened, and means for simultaneously operating all of said means.

8. In a device for setting a wire spoke having a head at one end to be supported in a wheel rim and a laterally projecting portion at its opposite end designed to be supported in and projected loosely through the hub flange opening, means for engaging the head of said spoke, means for engaging the inner end of said spoke and said laterally extending portion, means for simultaneously operating said means whereby the free end of the laterally extending portion of said spoke will be bent inwardly and drawn through said hub opening and permanently set with tension applied to said spoke.

Des Moines, Iowa, July 30, 1930.

HENRY J. HEIDER.